Nov. 6, 1923.
M. J. FITZGERALD
STREET CLEANING CART
Filed Sept. 20, 1922
1,473,572
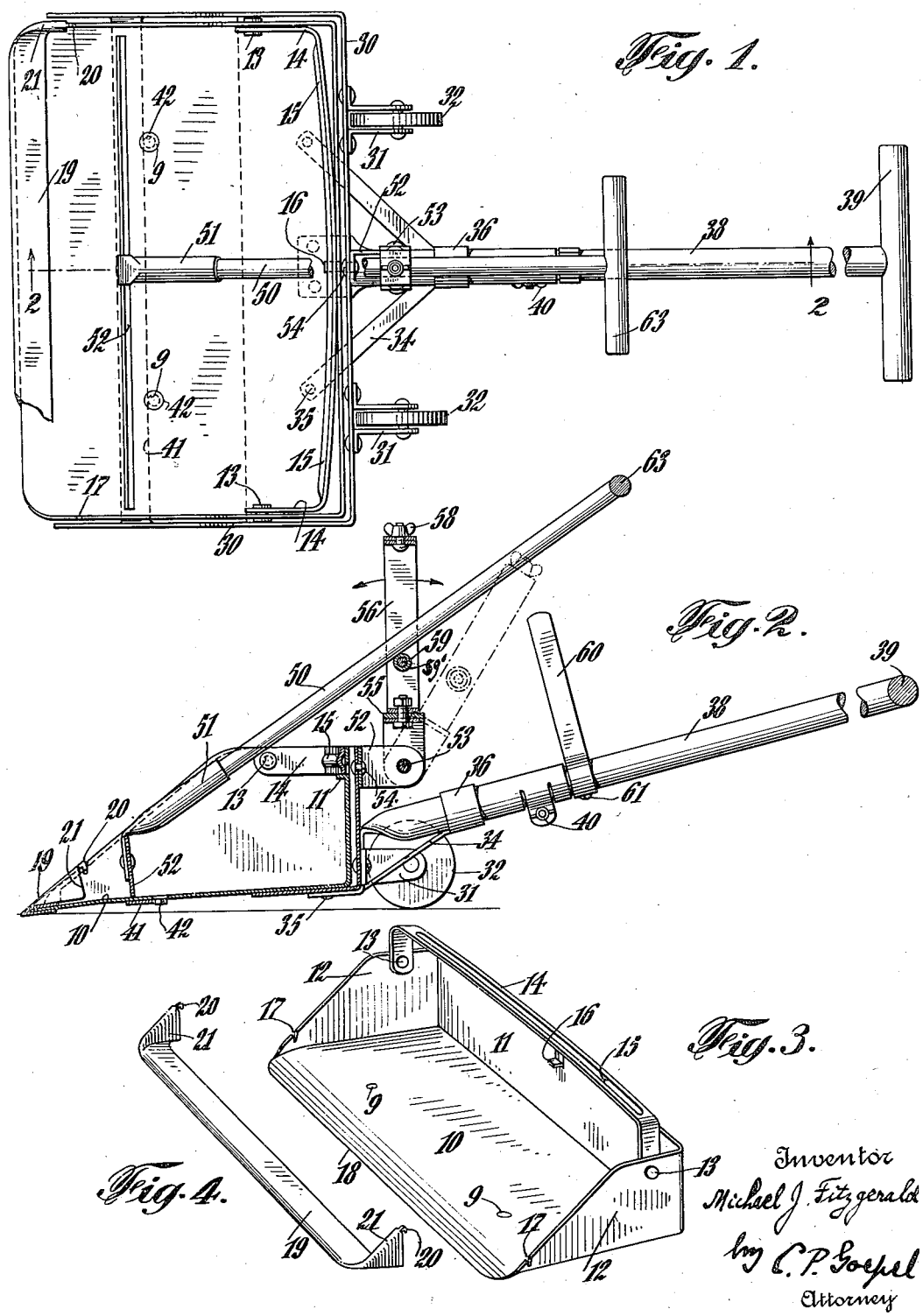

Patented Nov. 6, 1923.

1,473,572

UNITED STATES PATENT OFFICE.

MICHAEL J. FITZGERALD, OF NEW YORK, N. Y.

STREET-CLEANING CART.

Application filed September 20, 1922. Serial No. 589,288.

*To all whom it may concern:*

Be it known that I, MICHAEL J. FITZGERALD, a citizen of the United States, and resident of the city, county, and State of New York, have invented certain new and useful Improvements in Street-Cleaning Carts, of which the following is a specification.

This invention relates to cleaning devices adapted to be used for the cleaning of streets. Heretofore steel or other metal pans or scraping shovels having a handle have been used which are pushed along the street until a sufficient amount of dirt or other matters are accumulated. Then the contents of the scrapers are emptied on to the street in a pile and afterwards shoveled into a barrel, usually placed at the end of the street.

Such means and method entail certain disadvantages in that the pans are rather heavy to lift and soon become worn out. They also require considerable strength in being pushed along the street, making it burdensome for the operators.

To overcome the objections to the sweepers heretofore in use, my invention provides means for protecting the edge of the pan to prevent it from being worn out, and secondly, the invention provides means whereby the pan may be readily moved from place to place, and particularly it provides means whereby the pan may be readily lifted and dumped into a collecting barrel, or the pans when filled may be placed together at the end of a street for removal, my improved sweeper permitting substitute pans to be used in place of the one that is filled.

My invention comprises further features hereinafter more particularly described, shown in the drawings and finally pointed out in the claims.

In the accompanying drawings:

Fig. 1 shows a plan view of my improved device embodying my invention;

Fig. 2 shows a side view thereof;

Fig. 3 shows the pan removed, the figure showing the perspective view of the same; and Fig. 4 shows a perspective view of the protecting end of the pan.

Similar characters of reference indicate corresponding parts throughout the various views.

Referring to the drawings, and more particularly to Fig. 3, the pan or tray there shown is provided with a horizontal portion 10 having side pieces 12 and a rear piece 11, the parts 10, 11 and 12 forming a tray for the collection of the accumulated dirt and other matters. The tray is provided at 13 with pivot shafts to which are connected the ends of a handle 14, which is provided with a strengthening rib 15. When the tray is sufficiently full to warrant its removal, the handle 14 is gripped and the tray may be thereby lifted and the contents of same dumped anywhere desired. When the handle 14 is in use it is moved rearwardly of the tray, and to prevent it from moving out of the reach of the user and get into the way of the dirt and other matters a projection 16 is provided which limits the swing of the handle 14. The bottom portion 10 of the tray is provided with two openings 9 which are engaged by pins to be described hereinafter, which co-operating with the holes 9 prevent the tray from slipping out of its carriage. The side walls of the tray are provided with cut-out portions 17 which are engaged by hooks 20 formed on the end members 21 of a scraping bar 19, which bar extends along the front margin 18 of the pan or tray beneath said margin. The front margin of the tray is thereby protected against wear, as the scraping bar 19 is the portion that contacts with the surface of the street. As the member 19 wears out it may be readily replaced by a similar member, which may be easily hooked into place.

For the purpose of moving the tray with its reinforcing scraping member 19 along the street for the gathering of dirt and the like, a carriage is provided which consists of a frame 30 having rearwardly extending brackets 31 supported upon carrying wheels 32. At the bottom of the carriage 30 brackets 34 are fastened at their forward ends to the bottom of the carriage by means of rivets 35, or otherwise, and these brackets at their rear ends are connected to a socket member 36 which receives one end of a handle 38 having a cross-bar 39.

The handle 38 may be held securely in place by a thumb screw fastener 40 which is connected with an extension of the socket member 36. Along the bottom of the carriage 30 is provided a supporting strip of metal or the like 41, which aids to support the bottom 10 of the tray or pan. This portion 41 is so arranged as to co-operate with the pins 42 inserted in the holes 9 of the bottom 10 of the tray, and these pins 42 by abutting against the strip 41 prevent the tray from sliding downwardly out of the carriage. When it is desired to move the tray from the carriage the pins 42 may be moved out of the holes 9, and thereby the tray can be readily disengaged from the carriage. At the rear of the carriage 30 near the outer portion thereof a pivot pin 54 having its ends upset is provided, and this pivot pin holds a U-shaped member 52 pivotally in position. The free ends of the U-shaped member 52 are provided with a shaft 53 which engages the free ends of another U-shaped piece 55.

The member 55 is pivotally connected with the elongated yoke portion 56, and within this member the handle 50 of a rake or hoe may readily move. The member 56 is provided with a thumb screw 58 which may be disengaged so as to permit the member 56 to be opened and the handle 50 or the rake or hoe to be passed therethrough. Preferably, the member 56 is provided with a shaft 59 on which the handle 50 of the rake or hoe may rest. The part 56 may be turned in any direction, as in effect a double-joint action is provided. This facilitates the movement of the rake or hoe. The handle 38 is further provided with a supporting member 60 suitably secured to the handle 38 by a screw 61, and this serves as a support for the handle 50 of the rake or hoe when the rake is being used. The handle 50 is provided with a cross-handle 63 at one end, and with a sleeve member 51 to which may be attached a rake or hoe 52.

The operation of my improved device is as follows: An empty tray provided with a handle 14 and having its protecting member 19 thereon, is placed within the carriage 30 so that the pin 42 passing through the opening 9 engages against the strip 41. The handle 38 with its cross-handle 39 is then pushed so as to move the carriage 30 mounted on the wheels 32 with the member 19 barely touching the surface of the street to be cleaned. As the dirt or other matters accumulate upon the front portion of the tray the operator grips the cross-handle 63 or any other handle and moves the handle 50 of the rake or hoe in a reciprocatory manner, so as to move backward the dirt gathered at the front portion of the tray. The handle 50 may, for this purpose, readily ride upon a roller 59' or the shaft 59. When it is desired to use the rake or hoe it may rest on the shaft 59 and on the supporting member 60.

By the device described it is very readily seen that it provides an easy means of gathering dirt or other matters from the street in that the tray is so arranged within the carriage that the front portion thereof barely touches the ground and the rear portion thereof is supported and moved by the wheels. It is the adjustment of these two distances that make the removal of the tray a very easy one, and in this respect differs from any other devices heretofore proposed. In Fig. 2 it will be seen that the rear of the tray is slightly higher than the front of it, and this is so adjusted that a very easily movable tray within this carriage may be provided. As the carriage with its tray is moved along the rake or hoe serve to gather in the dirt or other accumulated matters.

When the tray is full, or sufficiently full to warrant its removal, the handle 14 is moved at its pivots 13, into the position as shown in Fig. 3, and thereby the tray is lifted from the carriage and out of the same, and it may then be placed along the corner of a street for the collecting wagon to gather up these trays, or the tray may be emptied into a collecting barrel at the corner of the street. To readily remove the tray the rake or hoe is moved out of the path of movement of the tray.

I have described an embodiment of my invention, but changes may be made therein without departing from the spirit of the same as defined in the annexed claims.

I claim as new and desire to secure by Letters Patent:

1. In a street cleaning cart, the combination of a wheel supported frame, a U-shaped bracket pivotally connected with said frame and rotatable on a horizontal axis, a second U-shaped frame pivotally mounted on the first-named frame, and rotatable on a horizontal axis, a yoke pivotally mounted to the second U-shaped frame and rotatable on a vertical axis, a removable tray mounted upon said frame, and a scraping device loosely mounted upon said tray and provided with a handle engaging said yoke and controlling the movements of said yoke and U-shaped frames.

2. In a street cleaning cart, the combination of a wheel supported frame provided with a guiding yoke having a double jointed connection with said frame, a tray detachably mounted upon said frame, and a scraping device loosely mounted upon said tray and provided with a handle engaging said yoke.

3. In a street cleaning cart, the combination of a wheel supported frame having a cross bar at the forward portion thereof, a removable tray mounted on said frame and provided with apertures, and pins extending through said apertures and bearing against the rear margin of said cross-bar, and a detachable scraping blade mounted on the forward end of said tray.

4. In a street cleaning cart, the combination of a wheel supported frame, a removable tray detachably mounted upon said frame and provided at its forward ends with recesses, and a scraping bar arranged beneath the front margin of said frame and provided with offset ends bearing against the sides of said tray, and with hooks engaging said recesses.

In testimony that I claim the foregoing as my invention, I have signed my name hereunder.

MICHAEL J. FITZGERALD.